(12) United States Patent
Córdova et al.

(10) Patent No.: US 8,568,564 B2
(45) Date of Patent: Oct. 29, 2013

(54) SHEET-FORMED FIBROUS MATERIAL WITH IMPROVED STRENGTH PROPERTY

(75) Inventors: Armando Córdova, Stockholm (SE); Jonas Fredrik Hafrén, Stockholm (SE); Karl Enquist, Täby (SE); Joseph Samec, Spånga (SE)

(73) Assignee: OrganoClick AB, Stockholm (SE)

( * ) Notice: Subject to any disclaimer, the term of this patent is extended or adjusted under 35 U.S.C. 154(b) by 67 days.

(21) Appl. No.: 12/936,032

(22) PCT Filed: Apr. 2, 2009

(86) PCT No.: PCT/EP2009/053936
§ 371 (c)(1),
(2), (4) Date: Jan. 13, 2011

(87) PCT Pub. No.: WO2009/121926
PCT Pub. Date: Oct. 8, 2009

(65) Prior Publication Data
US 2011/0114276 A1 May 19, 2011

(30) Foreign Application Priority Data
Apr. 3, 2008 (EP) .................................... 08154011

(51) Int. Cl.
*D21H 11/00* (2006.01)

(52) U.S. Cl.
USPC ...................................................... 162/164.7

(58) Field of Classification Search
USPC ...................................................... 162/164.7
See application file for complete search history.

(56) References Cited

U.S. PATENT DOCUMENTS

| | | | |
|---|---|---|---|
| 4,088,530 A | 5/1978 | Chan et al. | |
| 4,716,186 A | 12/1987 | Portnoy et al. | |
| 5,061,346 A | 10/1991 | Taggart et al. | |
| 5,959,101 A | 9/1999 | Engelskirchen et al. | |
| 6,294,645 B1 | 9/2001 | Allen et al. | |
| 6,518,419 B1 | 2/2003 | Van Der Lugt et al. | |
| 6,903,209 B2 | 6/2005 | Marritt | |
| 7,384,892 B2 | 6/2008 | Melbouci et al. | |
| 2005/0061204 A1 | 3/2005 | Skuratowicz | |

FOREIGN PATENT DOCUMENTS

| | | |
|---|---|---|
| EP | 0 440 472 | 8/1991 |
| EP | 0 614 914 | 9/1994 |
| EP | 1 043 391 | 10/2000 |
| GB | 766532 | 1/1957 |
| GB | 803670 A | 10/1958 |
| GB | 821375 | 10/1959 |
| GB | 1111273 | 4/1968 |
| SU | 49930 A1 | 8/1976 |
| WO | 95/11925 A1 | 5/1995 |
| WO | 01/87365 A2 | 11/2001 |
| WO | 2004/055267 A1 | 7/2004 |
| WO | 2006/079512 A1 | 8/2006 |
| WO | 2007/038964 A1 | 4/2007 |

OTHER PUBLICATIONS

International Search Report dated Aug. 3, 2009 in PCT/EP2009/053936, filed Apr. 2, 2009.
Extended Search Report dated Aug. 5, 2008 in European Patent Application No. 0815401, 7 pages.
Swedish Office Action dated Dec. 9, 2009, 5 pages (in Swedish language only).
WPI / Thomson English translation of the abstract related to SU 49930 A1, 1 page.
Watanabe, Masasuke, et al., "Advanced wet-end system with carboxymethyl-cellulose", TAPPI Journal, May 2004, vol. 3, No. 5, pp. 15-19.
Wågberg, Lars, "Polyelectrolyte adsorption onto cellulose fibres—A review", Nordic Pulp and Paper Research Journal vol. 15 No. 5/2000, pp. 586-597.
Blomstedt, Minna, "Modification of Cellulosic Fibers by Carboxymethyl Cellulose—Effects on Fiber and Sheet Properties", Helsinki University of Technology Laboratory of Forest Products Chemistry, Reports, Espoo 2007, 90 pages.
European Office Action issued in European Application No. 09 729 030.8 issued Feb. 21, 2011.
Communication pursuant to Article 94(3) EPC dated Jan. 24, 2013, issued in European Application No. 08 154 011.4-2115.
Communication pursuant to Article 94(3) EPC dated Jan. 24, 2013, issued in European Application No. 09 729 030.8-2115.

*Primary Examiner* — Mark Halpern
(74) *Attorney, Agent, or Firm* — Drinker Biddle & Reath LLP

(57) ABSTRACT

A method of improving a strength property of a sheet-formed fibrous material formed from an aqueous slurry of cellulose fiber, including coating at least one face of the material with a coating formulation including a polysaccharide containing at least two carboxylic groups and low molecular weight organic mono-, di- or poly-carboxylic acid in an aqueous carrier, keeping the coated face at a temperature of 50° C. or more for a time sufficient to obtain the desired improvement including drying of the material.

12 Claims, 3 Drawing Sheets

SHEET-FORMED FIBROUS MATERIAL WITH IMPROVED STRENGTH PROPERTY

CROSS REFERENCE TO RELATED APPLICATIONS:

This application is the National Stage of International Application No. PCT/EP2009/053936, filed Apr. 2, 2009, and claims benefit of European Application No. 08154011.4, filed Apr. 3, 2008, the contents of which are herein incorporated by reference. This application is a 371 of PCT/EP09/53936 filed 2 Apr. 2009.

FIELD OF THE INVENTION

The present invention relates to a method and a chemical formulation for improving strength properties of cellulose-based fibrous materials, and to correspondingly improved materials.

BACKGROUND OF THE INVENTION

In paper manufacture chemical additives have a pivotal role in enhancing the functionality of the paper product. A particularly desired functional property is dry strength, which is related to the structure of the paper web. Dry strength originates from hydrogen bonds between the fibers formed during the drying process. Additives for increasing or preserving dry strength belong to three categories: Additives enhancing fiber-fiber bonding; b) Additives enhancing fiber-fiber bond formation; and c) Additives improving fines retention and drainage.

Starch, both native and modified, is by far the most commonly used dry strength additive. In contrast to modified (cationic) starches used as dry-strength improving additives at the wet-end of the paper making process native starch lacks affinity towards cellulose fiber. While high starch addition rates are desired they result in incomplete starch adsorption on the fiber and thus in reduced efficiency, in operating problems caused by high levels of non-adsorbed starch re-circulating in the process, and in the difficulty to further increase the starch retention level. These effects are evident for cationic starch derivatives. Native starch can be applied by spraying methodology, for example in between layers on the paper machine. Alternatively, native starch can be applied by a coating process at the dry end of the paper machine.

U.S. Pat. No. 4,088,530 discloses that synthetic polymers, polyacrylamide, have been used as dry-strength additive.

WO 2006/079512 discloses a method of enhancing the mechanical properties of cellulose-based materials in form of a multi-component multi-step process based on xyloglucan.

Sodium carboxymethyl cellulose (CMC) is an anionic, water soluble polymer with no inherent affinity towards cellulose fibers. In order to create bonding between CMC and cellulose material different methodologies have evolved. These methods are however not efficient enough for general use in paper making but are restricted to the production of specialty papers, which can bear their high cost: Alum has been used as a cationic linker between CMC and cellulose fibers (Watanabe et al, Tappi J. 2004, 3, 15): U.S. Pat. Nos. 5,061,346 and 6,294,645 and patents cited therein relate to systems for imparting dry-strength to paper, a cationic component being sandwiched between the fiber and CMC. The cationic component is a polyamidoamine that has been treated with an epoxyhalohydrin. This methodology has been reviewed by Wågberg (Nord. Pulp. Pap. Res. J., 2000, 15, 586). Another approach to improve the dry strength of paper by co-crystallizing CMC and cellulose fibers before or after heating, that is before the fibers reach the paper machine is disclosed in PhD thesis by M Blomstedt ("MODIFICATION OF CELLULOSIC FIBRES BY CARBOXYMETHYL CELLULOSE EFFECTS ON FIBER AND SHEET PROPERTIES" Helsinki University of Technology, 2007). However, long reaction times, high pH, and high CMC loadings make this one-step process industrially disadvantageous.

There is no efficient one-step process disclosed in the art by CMC can be applied to paper or other fibrous cellulose products as a strengthening enhancer, and which is compatible with the process restrictions set by paper forming machinery.

OBJECTS OF THE INVENTION

It is an object of the invention to provide a low-cost, one step method of improving the strength properties of a sheet-formed fibrous material comprising or substantially consisting of cellulose fiber.

Another object of the invention is to generate a sheet formed fibrous material of the aforementioned kind that withstands rinsing with water at neutral pH.

An additional object of the invention is to generate a sheet formed fibrous material of the aforementioned kind, the re-pulpability of which is not impaired in respect of corresponding untreated sheet formed fibrous material.

A further object of the invention is to provide a method of the aforementioned kind, which can be implemented in the paper industry without substantial change to apparatus employed.

A still further object of the invention is to provide a method of the aforementioned kind that is advantageous from an environmental and health standpoint.

Even more objects of the invention will become evident from a study of the summary of the invention, a number of preferred embodiments illustrated in a drawing, and the appended claims.

SUMMARY OF THE INVENTION

According to the invention is disclosed a method of improving a strength property of a sheet-formed fibrous material comprising or substantially consisting of cellulose fiber comprising coating at least one face of the material with a coating formulation comprising or consisting of polysaccharide containing at least two carboxylic groups and low molecular weight organic mono-, di- or poly-carboxylic acid in an aqueous carrier, keeping the coated face a temperature of 50° C. or more for a time sufficient to obtain the desired improvement, drying the material.

A preferred strength property is dry-strength property selected from tensile strength (dry) (N/m), elongation (%), tearing resistance (Nm), stiffness (Nm) and Scott-Bond (J/m$^2$).

It is preferred for the temperature to be from about 70° C. to about 100° C. or more.

It is preferred for the heating time at a given temperature to correspond to the drying time at that temperature.

The carboxylated polysaccharide of the invention is one capable of forming a sol or a gel in the aqueous carrier. The carboxylated polysaccharide of the invention is preferably selected from carboxymethyl cellulose (CMC); polyuronic acid such as galacturonic acid, for instance as comprised by pectin, including; polyuronic acid such as mannuronic acid and guluronic acid, for instance as comprised by alginic acid; oxidatively degraded polyuronic acid, for instance as disclosed in U.S. Pat. No. 6,903,209; sodium carboxymethyl starch (CMS), for instance as disclosed in U.S. Pat. No. 4,716,186; oxidized starch, for instance as disclosed in U.S. Pat. Nos. 5,959,101 and 6,518,419; carboxymethyl hemicellulose as such and in admixture with carboxymethyl cellulose, such as disclosed in U.S. 2005/0061204 A1; carboxymethyl lignocellulose, such as disclosed in U.S. Pat. No. 7,384,892. The carboxylated polysaccharide of the invention comprises its stoïchometric and non-stoïchiometric sodium and potassium salts. Two or more carboxylated polysaccharides of the invention can be used in admixture.

The low molecular weight carboxylic acid of the invention is preferably an aliphatic carboxylic acid, most preferred a low molecular weight aliphatic di- or three-basic carboxylic acid. In particular, the carboxylic acid of the invention is one suitable for human consumption, such as acetic acid, mandelic acid, citric acid, tartaric acid, aspartic acid and glutamic acid. However, low molecular weight carboxylic acids less or not at all suited for human consumption, such as formic acid, propionic acid, butanoic acid, pentanoic acid, oxalic acid, maleic acid, succinic acid, glutaric acid may also be used, in particular for products not intended for contact with human skin. Particularly preferred are citric acid and tartaric acid. "Low molecular weight" in respect of the aliphatic organic acid of the invention signifies a molecular weight of less than 1000 Da, in particular of less than 500 Da, most preferred of less than 300 Da. Two or more carboxylic acids of the invention can be used in admixture.

The aqueous carrier of the invention is preferably water. The aqueous carrier may additionally comprise small amounts of inorganic salts such as sodium chloride, antioxidant such as ascorbic acid, metal ion scavenging agent such as EDTA, neutral or acidic surfactant, and the like. Also mechanical grade water, used in paper machines can be used.

The sheet-formed fibrous material formed from an aqueous slurry of cellulose fiber of the invention is in particular a paper based material such as printing paper, gypsum grade paper, kraft paper, paperboard, liquid packaging board, corrugated board, fine paper, and specialty paper. The cellulose fiber of the sheet-formed fibrous material is, for instance, one of unbleached wood pulp, bleached wood pulp, unbleached pulp, recycled pulp, cotton pulp, straw pulp, hemp pulp, viscose. Wood pulp of any sort may be used, in particular mechanical pulp, kraft pulp and sulphite pulp. The cellulose fiber of the invention can comprise hemicellulose and/or lignin, including hemicellulose and lignin modified by the respective pulping process and/or the respective bleaching process and/or otherwise chemically. The sheet-formed fibrous material of the invention is a material comprises one or more free surfaces to which the coating formulation of the invention can be applied. According to another aspect of the invention the sheet-formed fibrous material is one in which cellulose fibers are in their native state such as wood and wood products, in particular timber and plywood.

Also disclosed is a sheet-formed fibrous material of the invention comprising or substantially consisting of cellulose fibre modified by method of the invention or treated with the coating formulation of the invention. The material has improved dry strength.

More particularly the present invention relates to a method of enhancing a strength property of a sheet-formed fibrous material comprising or substantially consisting of cellulose fibre, comprising:

a) Providing a sheet-formed fibrous material formed from an aqueous slurry of cellulose fiber;

b) Providing a coating formulation comprising or substantially consisting of polysaccharide of the invention, low molecular weight carboxylic acid of the invention, and an aqueous carrier.

c) Dispensing the coating formulation on a face of the fibrous material by spray, brush or gravure coating;

d) Optionally, allowing the chemical formulation to be soaked into the fibrous material;

e) Heating the fibrous material with the chemical formulation dispensed thereon at a curing temperature of 50° C.-100° C. or more, preferably from 70° C.-100° C., for a time sufficient to increase a strength property of the dry fibrous material and to dry the material.

The method of the invention can be incorporated at the wet- or dry-end of a paper machine.

In the temperature range from 60° C. to 120° C. curing according to the invention is accomplished in by heating for about 40 min at the lower end to fro about 3 min at the higher end. Still higher curing or drying temperatures require correspondingly shorter heating times, such as, for instance from 1 min or less at 200° C. Alternatively, curing can be accomplished by heating the wet surface of the fibrous material for a very short time at a very high temperature, such as for a fraction of a second at a temperature of about 900° C. by irradiating the fibrous material with an infrared source. An important aspect of the method of the invention is that curing is accomplished by the normal drying temperatures and times of the paper machine. The process of the invention does not require non-standard changes in procedures and parameters of the industrial-scale paper machine with which the process is carried out.

Curing temperature and time is influenced by the nature of the carboxylated polysaccharide, the carboxylic acid, their weight proportions in the carrier, and the physical and chemical nature of the fibrous material. Adequate reaction conditions for a particular combination of carboxylated polysaccharide and carboxylic acid can be determined by a person skilled in the art by carrying out a few simple experiments based on the present disclosure of the invention.

According to the invention is furthermore disclosed a coating formulation comprising or substantially consisting of the carboxylated polysaccharide of the invention, the low molecular weight carboxylic acid of the invention, and the aqueous carrier of the invention. The coating formulation of the invention may additionally comprise paper chemicals that to not affect the strength properties of sheet-formed fibrous material comprising or substantially consisting of cellulose fibre, in particular paper, such as surfactants or printing aids. The coating formulation of the invention In the coating formulation of the invention the weight ratio of low molecular carboxylic acid to carboxylated polysaccharide is from 0.1 parts to 30 parts of acid per 100 parts of polysaccharide, more preferred from 5 parts to 15 parts of acid per 100 parts of polysaccharide. The combined concentration of carboxylated carbohydrate and organic acid in the aqueous carrier can vary from 0.1% by weight to 30% by weight. For spray coating a dry weight of from 1% to 5% is preferred.

DESCRIPTION OF PREFERRED EMBODIMENTS

The present invention will now be described by reference to a number of preferred embodiments illustrated in the following Examples.

EXAMPLE 1

Figure 1:
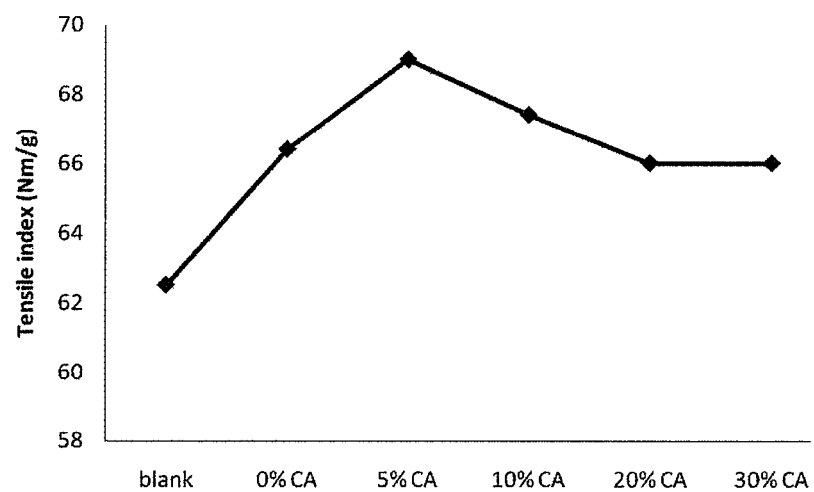
FIG. 1 is a diagram illustrating the tensile index of paper sheets treated with a composition of the invention comprising CMC and different amounts of citric acid.

Effect of low molecular carboxylic acid on tensile index. Laboratory paper sheets, 100 g/m$^2$, formed in a Rapid Köthen sheet former from unbleached hardwood and softwood fibers of chemical and chemo-thermal mechanical pulp were used. Aqueous chemical formulations of citric acid and CMC (Sigma-Aldrich (viscosity <200 cP, DS 0.65-1.0, purity 99.5%) or Dow-Wolff (viscosity 20-1000 cP, DS 0.82-0.95, purity 99%) were applied on the sheets by spray. The amount of citric acid was varied between 0-0.9 weight percent while the amount of CMC was held constant at 3 weight percent. In the case of 5% CA, an aqueous solution of CMC and citric acid was prepared by dissolving 30 g of CMC and 1.5 g of citric acid in 1 L water. The amount of applied formulation was determined gravimetrically. The sheets were heated in an oven to a temperature of 94° C. for 10 min at 1 bar. After conditioning over night the strength properties of the sheets were examined by means of a Testometric materials testing machine. The results are shown in FIG. 1, in which blank refers to non-modified paper sheet, 0% CA refers to 3 weight-% CMC, 5% CA refers to 0.15 weight-% citric acid and 3 weight-% CMC, etc.

bleached mixed hardwood (dominating component: white birch) pulp, softwood (dominating component: Norway spruce) pulp, mixed softwood/hardwood pulp, and recycled pulp. In addition sheets of Whatman filter were used. The sheets were wetted by soaking with 1-5 weight % of the following strength enhancing formulations: (a) citric acid and CMC, (b) propionic acid and CMC; (c) tartaric acid and CMC. CMC from Sigma-Aldrich (viscosity <200 cP, Degree of Substitution (DS) 0.65-1-0, purity 99.5%) or Dow-Wolff (viscosity 20-1000 cP, DS 0.82-0.95, purity 99%) was used. The aqueous solutions of CMC and citric acid was prepared by dissolving 30 g of CMC or pectin (Fluka, no. 76280) and given weight of citric acid in 1 L of water The wetted sheets were placed on a thin plastic film and heated in an oven for 1 to 40 min at a temperature of from 40° C. to 120° C. For comparison, certain samples were washed with water (drained 3×1 L) and dried again as before to determine the durability of the modifications. The sheets were conditioned over night at room temperature. Their strength properties were analyzed in a Testometric materials testing machine. The results clearly demonstrate that the addition of the carboxylic acid catalyst to the aqueous solution enhances the tensile strength index as compared with an aqueous solution containing only the carboxylated polysaccharide (e.g. sample 1, 2 and 3 in table 1), whereas addition of only carboxylic acid give no increase in tensile index (see sample 12, table 1). The results also show that the addition of the carboxylic acid catalyst to the aqueous solution gives a much improved tensile strength index after rinsing with water (e.g. sample 7, 8, and 9 in table 1) indicating that a higher amount of the carboxylated polysaccharide are attached to the fibers with strong bonds.

TABLE 1

| Entry | Fiber | Conc. of strength formulation (weight-%) | Agent | Org. acid (weight-%)$^a$ | T (° C.) | Reaction time (min) | Wash | Tensile index (Nm/g) |
|---|---|---|---|---|---|---|---|---|
| 1 | Virgin | — | — | — | — | — | — | 90.7 |
| 2 | Virgin | 1 | CMC | 0 | 100 | 20 | No | 102 |
| 3 | Virgin | 1 | CMC | C, 10 | 100 | 20 | No | 106.7 |
| 4 | Virgin | 1 | CMC | C, 10 | 100 | 8 | No | 105.5 |
| 5 | Virgin | 1 | CMC | C, 10 | 40 | 25 | No | 98 |
| 6 | Re-cy | — | — | — | — | — | — | 30 |
| 7 | Re-cy | 5 | CMC | 0 | 100 | 15 | Yes | 25.6 |
| 8 | Re-cy | 5 | CMC | C, 5 | 100 | 15 | Yes | 63 |
| 9 | Re-cy | 5 | CMC | C, 20 | 40 | 15 | Yes | 82 |
| 10 | FP | — | — | — | — | — | — | 16.7 |
| 11 | FP | 3 | CMC | 0 | 100 | 10 | No | 37 |
| 12 | FP | 1 | — | 1$^b$ | 100 | 10 | No | 15.4 |
| 13 | FP | 3 | CMC | C, 5 | 100 | 10 | No | 41.9 |
| 14 | Virgin | — | — | — | — | — | — | 83.6 |
| 15 | Virgin | 1 | Pectin | P, 10 | 100 | 20 | No | 84.8 |
| 16 | Virgin | 1 | Pectin | P, 10 | 100 | 20 | No | 90.5 |

$^a$C = citric acid; P = propionic acid, Org. acid weight % refers to dry weight of the organic acid:dry weight of carboxylated polysaccharide.
$^b$Refers to 10 g of citric acid and 1 L of water. Re-cy = re-cycled. FP = filter paper.

A solution prepared by adding 40 g of CMC (Sigma-Aldrich (viscosity <200 cP, DS 0.65-1.0, purity 99.5%) and 4 grams of citric acid to 1000 g of water gives a viscosity of η=200 cP and a solution prepared by dissolving 100 g of CMC and 10 grams of citric acid in 1000 g of water gives a viscosity of η=5560 cP.

EXAMPLE 2

Application of the formulation of the invention by soaking. Hand-made paper sheets (60-140 g/m$^2$) were prepared from

EXAMPLE 3

Application of the formulation of the invention by a laboratory coater "K202 Control Coater". Laboratory paper sheets, 60 g/m$^2$, formed in a Rapid Köthen sheet former from bleached hardwood and bleached softwood fibers or paper board, 280 g/m$^2$ were used. Aqueous strength enhancing formulation solutions of citric acid and CMC (Sigma-Aldrich (viscosity <200 cP, DS 0.65-1.0, purity 99.5%) or Dow-Wolff (viscosity 20-1000 cP, DS 0.82-0.95, purity 99%) were prepared by dissolving 10, 20, or 40 g of CMC and 1, 2, or 4 g of citric acid in 1 L of water and applied to the sheets by a laboratory coater. The amount of applied formulation was determined gravimetrically, and varied from 0.2% by weight to 4% by weight of dry fiber. The sheets were heated in an oven to a temperature of 105° C. for 10 min. After conditioning over night the strength properties of the sheets were examined by means of a Testometric materials testing machine. The results clearly indicate that the tensile strength index increases when applying higher amounts of chemical formulation onto the laboratory paper sheet (see e.g. samples 4-6 in Table 2).

TABLE 2

| Entry | Area weight ($g/m^2$) | Conc. of strength formulation (weight-%)[a] | Applied strength formulation (weight-%)[b] | Tensile Index (Nm/g) |
|---|---|---|---|---|
| 1 | 60 | — | — | 82.5 |
| 2 | 60 | 1 | 1 | 87.3 |
| 3 | 60 | 1 | 2 | 95.7 |
| 4 | 60 | 2 | 1 | 85.1 |
| 5 | 60 | 2 | 2 | 92.1 |
| 6 | 60 | 2 | 3 | 95.0 |
| 7 | 280 | — | — | 61.1 |
| 8 | 280 | 4 | 0.2 | 69.6 |
| 9 | 280 | 4 | 0.4 | 70.9 |

[a]Concentration of strength enhancing formulation: total dry formulation chemicals in water (w/w).

TABLE 2-continued

| Entry | Area weight ($g/m^2$) | Conc. of strength formulation (weight-%)[a] | Applied strength formulation (weight-%)[b] | Tensile Index (Nm/g) |
|---|---|---|---|---|

[b]Applied strength enhancing formulation: dry formulation chemicals on dry fiber (w/w).

EXAMPLE 4

Application of the formulation of the invention by spray coating. Laboratory paper sheets, 60-290 $g/m^2$, formed in a Rapid Köthen sheet former from chemical or chemo-thermo mechanical softwood, hardwood, and recycled pulp and mixtures thereof were used. Several pulp samples comprised commonly used paper wet-end process additives. The sheets were sprayed before or after press with 3% by weight of aqueous strength enhancing formulations of CMC (Sigma-Aldrich (viscosity <200 cP, DS 0.65-1.0, purity 99.5%) or Dow-Wolff (viscosity 20-1000 cP, DS 0.82-0.95, purity 99%) or carbomethoxylated starch (CMS; Emsland Stärke, viscosity 200 cP, D.S. 0.3, purity 70-80%) containing from 0-30% by weight of citric acid. The aqueous solutions of CMC or CMS and citric acid was prepared by dissolving 10 g of CMC or CMS and 0-9 g of citric acid in 1 L of water. The amount of applied formulation was determined gravimetrically, and varied from 0% by weight to 26% by weight of dry fiber. The sheets were heated in an oven to a temperature of 94° C. for 10 min under reduced pressure (1 bar) or 120° C. for 1 hour. After conditioning over night the mechanical properties of the sheets were examined by means of a Testometric materials testing machine. The results clearly show that addition of the carboxylic acid to the chemical formulation results in a higher tensile strength index (see e.g. samples 4-6 in Table 3).

TABLE 3

| Entry | Fiber | Formulation (weight-%)[a] | CMC or CMS | Citric acid (weight-%)[b] | Formulation/ fiber (weight-%)[c] | Area weight ($g/m^2$) | Tensile index (Nm/g) |
|---|---|---|---|---|---|---|---|
| 1 | Virgin-ch | — | — | — | — | 60 | 79.3 |
| 2 | Virgin-ch | 3 | CMC | 10 | 5 | 60 | 89.9 |
| 3 | Virgin-ch | 3 | CMC | 10 | 10 | 60 | 91.9 |
| 4 | Re-cycled | — | — | — | — | 100 | 35.4 |
| 5 | Re-cycled | 3 | CMC | 0 | 2 | 100 | 44.4 |
| 6 | Re-cycled | 3 | CMC | 30 | 2 | 100 | 47.5 |
| 7 | Re-cycled | 3 | CMC | 0 | 2 | 100 | 39.8 |
| 8 | Re-cycled | 3 | CMC | 5 | 2 | 100 | 41 |
| 9 | CTMP | — | — | — | — | 60 | 62.5 |
| 10 | CTMP Virgin-ch | 3 | CMC | 0 | 3 | 60 | 66.4 |
| 11 | CTMP Virgin-ch | 3 | CMC | 5 | 3 | 60 | 69 |
| 12 | CTMP Virgin-ch | 3 | CMC | 10 | 3 | 60 | 67.5 |
| 13 | CTMP Virgin-ch | 3 | CMS | 0 | 3 | 60 | 63.5 |
| 14 | CTMP Virgin-ch | 3 | CMS | 10 | 3 | 60 | 64.5 |
| 15 | CTMP Virgin-ch | 3 | CMS | 20 | 3 | 60 | 66 |
| 16 | CTMP Virgin-ch | 3 | CMS | 30 | 3 | 60 | 64.3 |

[a]Concentration of strength enhancing formulation refers to g dry CMC or CMS to 1 L of water.
[b]Citric acid weight-% refers to dry weight ration of citric acid/dry weight CMC or CMS.
[c]Strengthening formulation/fiber (weight-%) refers to dry weight chemical/dry weight fiber ratio. Virgin-ch = Virgin chemical.

EXAMPLE 5

Applying the formulation of the invention by gravure coating paper on a pilot-scale. Paper board from chemical and chemo-thermo mechanical softwood and hardwood, were used. The paper board comprised commonly used paper wet-end process additives. The paper board was coated on a Jagenberg Pilot Machine (500 m/min). 3% by weight of aqueous chemical formulation of CMC (Sigma-Aldrich or Dow-Wolff) containing 0.3% by weight of citric acid was applied by mono-gravure methodology. The amount of applied formulation was determined by measuring consumed formulation, and was around 0.2% by weight of dry fiber. The paper board was heated by IR irradiation and the paper board reached a maximum temperature of 86° C. After conditioning over night the mechanical properties of the sheets were examined by means of a Testometric materials testing machine. The tensile index increased from 81 Nm/g (unmodified paper board) to 84.5 Nm/g (modified paper board).

EXAMPLE 6

Applying the formulation of the invention by spray-coating paper on a pilot-scale. An XPM pilot machine with pulp from chemical and chemo-thermo mechanical softwood and hardwood, was used. The pulp comprised commonly used paper wet-end process additives. The chemical formulation was applied in the wire-section. Aqueous cross-linking formulations 1-2% by weight of CMC containing 0.1-0.2% by weight of citric acid, or 1-2% CMS containing 0.1-0.2% by weight of citric acid were applied by spray. The amount of applied formulation was determined by measuring the flow of the spray (0.7-3% by weight of dry fiber for CMC and 0.9-6.8% for CMS). The paper was pressed and dried in the XPM-pilot machine using standard conditions. After conditioning over night the mechanical properties of the sheets were examined. The tensile index increased from 50 Nm/g (unmodified paper) to 61.6 Nm/g (CMC and citric acid modified paper) and 58.0 Nm/g (CMS and citric acid modified paper). Scott Bond increased from 180 J/m$^2$ to 334.5 J/m$^2$ (CMC and citric acid modified paper) and from 180 J/m$^2$ to 271 J/m$^2$ (CMS and citric acid modified paper).

EXAMPLE 7

Optimization of Reaction Parameters

Reaction Temperature V. Time

Initially, drying time at different temperatures was determined on separate paper-sheets. After this, dry paper sheets were wetted in a solution prepared by dissolving 10 g of CMC and 1 g of citric acid in 1000 g of water. The paper sheets were placed on a thin plastic film and heated separately in a heat oven at respective time and temperature until the paper sheets were dry. The results are shown in FIG. 1. An unmodified paper sheet has a tensile index of 89 Nm/g. A paper sheet modified with CMC and without CA has a tensile index of 102 Nm/g. An optimum in tensile index was observed at 80° C. It appears as the effect of citric acid requires a temperature of at least 60° C., as the effect at 40° C. is similar to the results without citric acid.

Surfactant

Surfactant (Surfynol®) did not affect the mechanical properties in experiments with carboxymethyl starch.

Adsorption Isotherm

Figure 2:
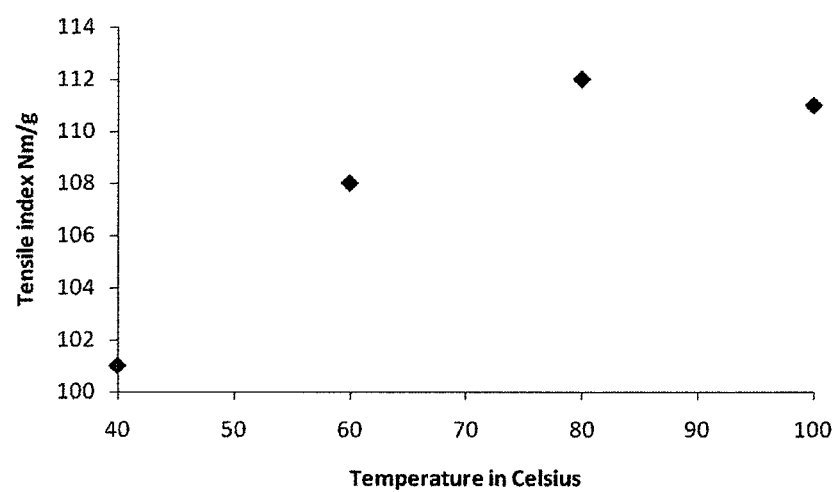
FIG. 2 is a diagram illustration the tensile index of paper sheets treated with a composition of the invention comprising CMC and citric acid.

Paper sheets 60 g/m$^2$ formed in a Rapid Köthen Sheet former using chemo thermo mechanical pulp were used. After press, the laboratory paper sheets were sprayed with a strengthening formulation solution prepared by dissolving 30 g of CMC and 3 g of citric acid in 1000 g of water. The amount of applied formulation was determined gravimetrically. The paper sheets were dried at 90° C. and 1 bar for 10 min. Before analysis the paper sheets were conditioned over night. The results are shown in FIG. 2.

Organic Acid Concentration

Figure 3:
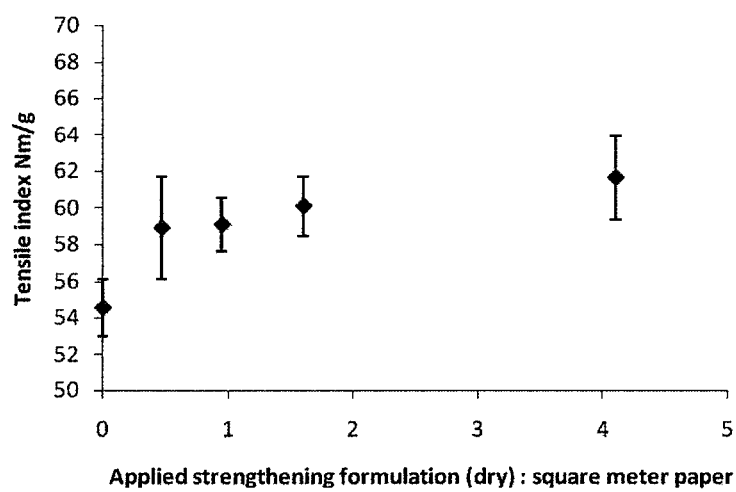
FIG. 3 is a diagram illustrating the tensile index of paper sheets treated with different amounts of a composition of the invention comprising CMC and citric acid.

Paper sheets (60 g/m$^2$) formed in a Rapid Köthen Sheet former using chemo thermo mechanical pulp were used. After press, the laboratory paper sheets were sprayed with a solution of 30 g of CMC in 1000 g of water containing varying amounts of citric acid. The applied amount of formulation was determined gravimetrically. The sheets were dried at 90° C. and 1 bar for 10 min. Before analysis the paper sheets were conditioned over night. The results are shown in FIG. 3.

The invention claimed is:

1. A method of improving a strength property of a sheet-formed fibrous material formed from an aqueous slurry of cellulose fiber, comprising
    a) providing a coating formulation consisting of:
        a polysaccharide containing at least two carboxylic groups, selected from the group consisting of carboxymethyl cellulose (CMC); polyuronic acid; oxidatively degraded polyuronic acid; sodium carboxymethyl starch; oxidized starch; carboxmethyl hemicellulose; carboxymethyl lignocellulose; and mixtures thereof; or stoichometric and non-stoichiometric sodium and potassium salts thereof;
        a low molecular weight organic mono-, di- or poly-carboxylic acid, selected from the group consisting of acetic acid, mandelic acid, citric acid, tartaric acid, aspartic acid, glutamic acid, formic acid, propionic acid, butanoic acid, pentanoic acid, oxalic acid, maleic acid, succinic acid, and glutaric acid; or a mixture of said organic mono-, di- or poly-carboxylic acids; and
        an aqueous carrier;
    b) dispensing the coating formulation on at least one face of said sheet-formed fibrous material by spraying, brushing or gravure coating; and
    c) keeping the coated face of the sheet-formed fibrous material with the coating formulation dispensed thereon at a temperature of 70° C. to 100° C. for a time sufficient to obtain an improved strength property.

2. The method according to claim 1, wherein the time sufficient for obtaining the improved strength property is a drying time.

3. The method according to claim 1, wherein the improved strength property is selected from the group consisting of tensile strength (dry) (N/m), elongation (%), tearing resistance (Nm), stiffness (Nm), and Scott-Bond (J/m$^2$).

4. The method according to claim 1, wherein the aqueous carrier is water, and optionally comprises small amounts of inorganic salts, an anti-oxidant, a metal ion scavenging agent, a neutral surfactant, or an acidic surfactant.

5. The method according to claim 4, wherein the inorganic salt is sodium chloride, the anti-oxidant is ascorbic acid, and the metal ion scavenging agent is EDTA.

6. The method according to claim 1, wherein the sheet-formed fibrous material is a paper based material.

7. The method according to claim 6, wherein the printing paper is selected from the group consisting of gypsum grade paper, kraft paper, paperboard, liquid packaging board, corrugated board, fine paper, and specialty paper.

8. The method according to claim 1, wherein the cellulose fiber of the sheet-formed fibrous material comprises wood pulp, cotton pulp, straw pulp, hemp pulp, viscose, or their mixtures.

9. The method according to claim 1, wherein the a combined concentration of said polysaccharide and said low molecular weight organic mono-, di- or poly-carboxylic acid in the aqueous carrier is from 0.1% by weight to 30% by weight.

10. The method according to claim 1, wherein the coating formulation is a spraycoating formulation and a total concentration of said polysaccharide and said low molecular weight organic mono-, di- or poly-carboxylic acid in the aqueous carrier is from 1% by weight to 5% by weight.

11. The method according to claim 1, wherein the coating formulation has a viscosity of from 40 cP to 5000 cP.

12. A method of improving a strength property of a sheet-formed fibrous material formed from an aqueous slurry of cellulose fiber, comprising a) providing a coating formulation consisting of:
  a polysaccharide containing at least two carboxylic groups, selected from the group consisting of carboxymethyl cellulose (CMC); polyuronic acid; oxidatively degraded polyuronic acid; sodium carboxymethyl starch; oxidized starch; carboxmethyl hemicellulose; carboxymethyl lignocellulose; and mixtures thereof; or stoichometric and non-stoichiometric sodium and potassium salts thereof;
  a low molecular weight organic mono-, di- or poly-carboxylic acid, selected from the group consisting of acetic acid, mandelic acid, citric acid, tartaric acid, aspartic acid, glutamic acid, formic acid, propionic acid, butanoic acid, pentanoic acid, oxalic acid, maleic acid, succinic acid, and glutaric acid; or a mixture of said organic mono-, di- or poly-carboxylic acids; and
  an aqueous carrier;

b) dispensing the coating formulation on at least one face of said sheet-formed fibrous material by spraying, brushing or gravure coating; and c) keeping the coated face of the sheet-formed fibrous material with the coating formulation dispensed thereon at a temperature of 70° C. to 100° C. for a time sufficient to obtain an improved strength property, wherein a ratio of said low molecular weight organic mono-, di- or poly-carboxylic acid to said polysaccharide is from 0.1 to 30 parts relative to 100 parts of said polysaccharide containing at least two carboxylic groups.

* * * * *